(12) United States Patent
Aust et al.

(10) Patent No.: US 12,523,149 B2
(45) Date of Patent: Jan. 13, 2026

(54) CUTTING-RING ASSEMBLY

(71) Applicant: AKTIEBOLAGET SKF, Gothenburg (SE)

(72) Inventors: Wolfgang Aust, Bamberg (DE); Josef Hahn, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 158 days.

(21) Appl. No.: 18/459,527

(22) Filed: Sep. 1, 2023

(65) Prior Publication Data
US 2024/0084700 A1   Mar. 14, 2024

(30) Foreign Application Priority Data

Sep. 13, 2022  (DE) .......................... 102022209534.0

(51) Int. Cl.
*E21D 9/10*  (2006.01)
*F16C 19/38*  (2006.01)

(52) U.S. Cl.
CPC ........... *E21D 9/1006* (2013.01); *E21D 9/104* (2013.01); *F16C 19/386* (2013.01)

(58) Field of Classification Search
CPC ...... E21D 9/1006; E21D 9/104; F16C 19/386
See application file for complete search history.

(56) References Cited

U.S. PATENT DOCUMENTS

| | | | | |
|---|---|---|---|---|
| 3,216,513 A | * | 11/1965 | Robbins | F16C 19/49 384/93 |
| 3,734,213 A | * | 5/1973 | Goodfellow | E21B 10/24 451/540 |
| 5,507,355 A | * | 4/1996 | Mattsson | E21B 10/12 175/371 |
| 5,577,565 A | * | 11/1996 | Kocab | F16C 33/76 175/372 |

* cited by examiner

*Primary Examiner* — Janine M Kreck
(74) *Attorney, Agent, or Firm* — J-TEK LAW PLLC; Scott T. Wakeman; Mark A. Ussai

(57) ABSTRACT

A cutting ring assembly for a tunnel boring machine includes a fixed axle, an inner ring rotationally fixed to the axle and having an inner raceway on a radially outer surface, a cutting ring having a radially inner surface forming an outer raceway, and a plurality of rolling elements between the inner raceway and the outer raceway supporting the cutting ring on the inner ring for rotation relative to the axle.

14 Claims, 1 Drawing Sheet

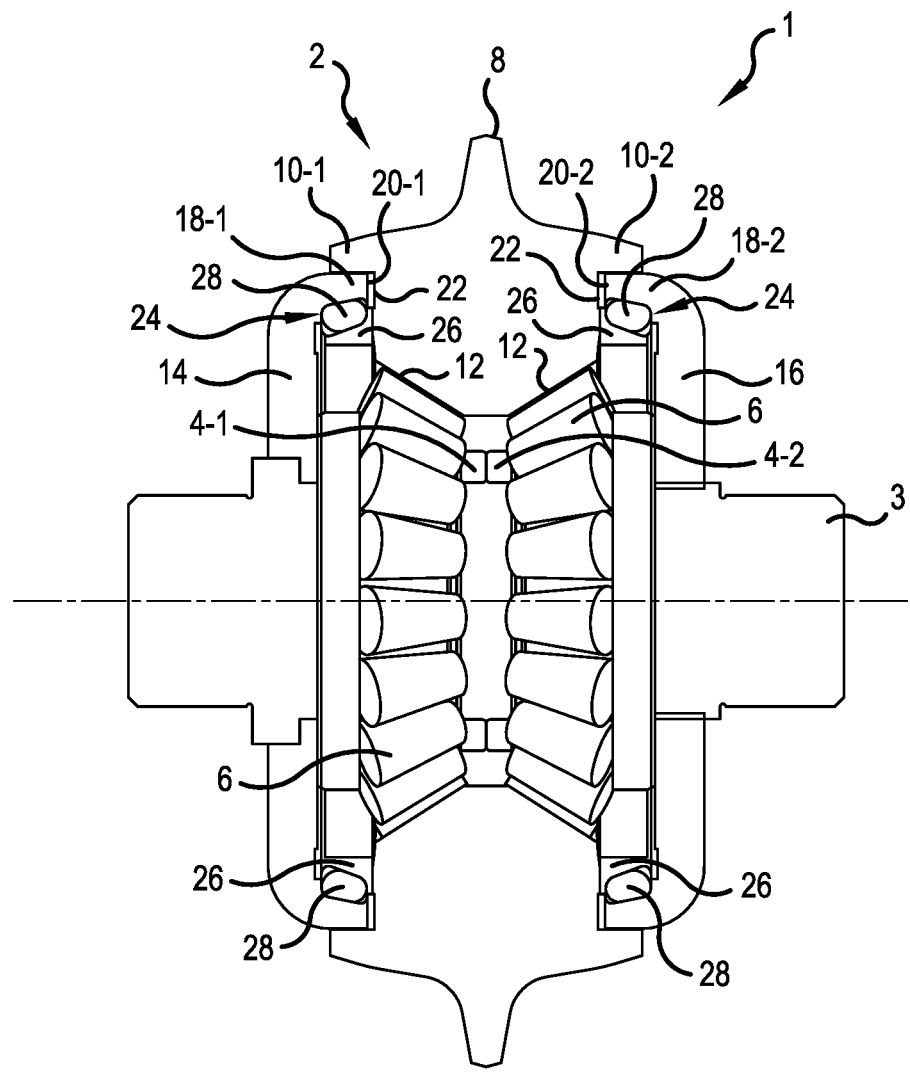

CUTTING-RING ASSEMBLY

CROSS-REFERENCE

This application claims priority to German patent application no. 10 2022 209 534.0 filed on Sep. 13, 2022, the contents of which are fully incorporated herein by reference.

TECHNOLOGICAL FIELD

The present disclosure is directed to a cutting ring assembly for a tunnel boring machine that has an improved outer ring, to a cutting ring of the cutting ring assembly and to a tunnel boring machine having the cutting ring assembly.

BACKGROUND

A tunnel boring machine is an excavation device that is usually used for boring a tunnel through soil and rock layers. In a conventional tunnel boring machine, the boring head rotates and generates a smooth circular tunnel wall. On the axial front side of the boring head, which has a circular surface, a plurality of cutting ring assemblies are disposed that are also rotatably supported. Here the rotational axes of the cutting ring assemblies lie radially outward of the rotational axis of the boring head.

During a boring process, the boring head of the tunnel boring machine is pressed against a target surface with considerable force so that at least some of the cutting ring assemblies engage into the surface. When the boring head of the tunnel boring machine rotates, the cutting rings fractionate, crush, and/or release the ground material, which is then transported away from the tunnel boring machine. When the released material is removed, the tunnel boring machine bores the tunnel.

In order to rotatably support the cutting ring assembly, the cutting ring is installed on a housing that is connected to an axle by a rolling-element bearing. An important criterion for the lifespan of the cutting ring assembly is the lifespan of the rolling bearing that is used to support the cutting ring. The service life of a bearing is dependent among other things on a defined rolling motion of the rolling elements of the bearing. However, during the installation of the bearing assembly of the cutting ring it is difficult to determine whether such a defined rolling motion of the rolling elements is taking place in the installed bearing assembly.

SUMMARY

It is therefore an aspect of the present disclosure to provide a cutting ring assembly with an improved bearing assembly.

In the following discussion, a cutting ring assembly is provided, in particular for a tunnel boring machine. The cutting ring assembly comprises a cutting ring that is supported on a fixed axle by at least one rolling-element row with a plurality of rolling elements, wherein the rolling elements roll on an inner raceway and an outer raceway. For example, the cutting ring assembly may have two rolling-element rows. In order to be able to provide a preload in the bearing assembly, the bearing assembly can be preloaded by a preload component, such as, for example, a clamping ring or a shaft nut.

Furthermore, the cutting ring includes an encircling cutting edge on a radially outer-lying surface that can be suitable for crushing rock and/or earth. The rolling elements are preferably tapered rollers that are advantageously suited to support both high axial and high radial loads. The cutting ring can preferably have an outer diameter of more than 15 cm.

In the cutting ring assembly, the inner raceway is provided on an inner ring connected to the axle such that the inner ring and the axle are rotationally fixed, and in order to improve the support of the cutting-roller assembly, the outer raceway is provided on a radially inner surface of the cutting ring. This has the advantage that in comparison to a conventional outer ring, the cutting ring has a significantly greater material strength in the radial direction so that the risk that the raceways deform due to the forces acting thereon and thereby disrupt the rolling movement of the rolling elements is further minimized. Furthermore, the cutting-roller assembly can be made more compact since the outer rings can be omitted. Furthermore, the cutting ring assembly also makes it possible to provide a steeper pressure angle, whereby a better load carrying capacity is possible. The at least one outer raceway in the radially inner surface of the cutting ring is preferably turned and/or ground.

Conventional cutting rings are components that are subjected to high wear and therefore must be exchanged or at least reprocessed at regular intervals. However, due to the reprocessing and/or the exchanging of the cutting ring, the defined alignment of outer ring and inner ring can deteriorate in the conventional cutting ring assembly. Since the cutting ring itself is now provided with the outer raceways, during the reprocessing of the cutting ring or during the exchanging of the cutting ring, the outer raceways can also be processed and the bearing assembly set such that a defined rolling movement of the rolling element can be ensured.

The radially inner surface of the cutting ring and the inner ring define between them an interior in which the rolling elements are disposed. Furthermore, the cutting ring assembly can include an end cap and/or a closure cap that delimits the interior in an axial direction, and the end cap and the closure cap are connected to the axle such that they are rotationally fixed with the axle. This makes it possible to protect the interior from external contaminants.

According to a further preferred embodiment, there is provided a slide-ring seal between the end cap and the cutting ring and/or between the closure cap and the cutting ring, wherein the slide-ring seal includes at least one metallic slide ring that slidingly abuts against an axially lateral surface of the cutting ring, and at least one preload element, wherein the preload element is configured to preload the slide ring in order to seal the interior. The preload element can in particular be an elastic preload element. For example, the preload element can be manufactured from an elastomer.

In particular, the preload element and the closure cap or the end cap can work together in order to preload the slide ring. For example, a first slide ring and a first preload element can be disposed on the cutting ring, and a second slide ring and a second preload element can be disposed on the closure cap or end cap. The first and the second preload element then preload the first and the second slide ring such that the first and the second slide ring slidingly abut against each other and thus seal the interior.

The axial side surface of the cutting ring is advantageously configured as slide surface for the slide ring. This has the advantage that in contrast to known slide-ring seals, in which each slide-ring seal is comprised of two slide rings and two preload elements, each slide-ring seal includes exactly one slide ring and exactly one preload element. That is, by configuring the axially lateral surfaces of the cutting ring as slide surfaces for a slide-ring seal, the number of required slide-ring seals can be halved, since only one slide ring is required on each axial side of the cutting ring assembly.

The cutting ring preferably includes at least one shoulder that protrudes axially outward. Furthermore, the closure cap and/or the end cap can include an axially inwardly protruding projection, the at least one shoulder and the projection lying radially adjacent to each other, and the axially inner surface of the projection opposes the axially lateral surface of the cutting ring. This makes it possible that a certain degree of sealing can already be achieved using the shoulder and the projection. At the same time, the projection can serve as stop or seat for the preload element, whereby the slide ring can better abut against the axially lateral surface of the cutting ring.

Alternatively or additionally, the cutting ring assembly can include at least one further seal assembly that additionally seals the interior. The seal assembly may be disposed, for example, on at least one axial outer side of the bearing assembly. The bearing assembly can thereby be protected even better against contaminants, which also further increases the lifespan of the bearing assembly. For example, the further seal assembly can include at least one seal lip and can be configured as a contacting seal. Alternatively, the further seal can be configured as a cassette seal.

The radially outer surface of the projection, the axially inner surface of the projection, and/or the radially inner surface of the shoulder are preferably configured as slide surfaces. This makes it possible to further reduce friction in the cutting ring assembly.

According to a further preferred embodiment, the inner ring includes a first part and a second part, and the first and the second part each include an elongated shoulder or an elongated leg that extend toward each other in the axial direction and oppose each other, wherein the elongated shoulders of the first and of the second part abut against each other an installed state. This allows for a defined rolling movement of the rolling elements in a installed state and thereby increases the lifespan of the bearing assembly. The bearing assembly can advantageously be preloadable using a preload element, and the elongated shoulders of the first and of the second part abut against each other in a preloaded state.

The elongated shoulders can be formed integrally with the ring parts. The defined spacing between the ring parts achieved by the elongated shoulders is particularly important with tapered rollers where an interlocking of the rolling elements on the raceway or a sliding movement on the raceways due to a non-optimized arrangement of bearing rings and rolling elements with respect to each other must be strictly prevented. Furthermore, the defined distance between the ring parts makes it possible to achieve a more uniform load on the rolling elements. At the same time, it should also be ensured that the preload on the rolling elements is not excessive, since that will produce a load that is too high, which can also lead to a shortened service life.

A further aspect of the present disclosure relates to a cutting ring for a cutting ring assembly, as described above. Furthermore, a still further aspect of the present disclosure relates to a tunnel boring machine with at least one cutting ring assembly, as described above.

Further advantages and advantageous embodiments are specified in the description, the drawings, and the claims. Here in particular the combinations of features specified in the description and in the drawings are purely exemplary so that the features can also be present individually or combined in other ways.

In the following the disclosure is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a side elevational view, partly in section, of a cutting ring assembly according to an embodiment of the present disclosure.

DETAILED DESCRIPTION

In the following, identical or functionally equivalent elements are designated by the same reference numbers.

FIG. 1 shows a cutting-roller assembly 1 according to a first embodiment. The cutting-roller assembly 1 includes a cutting ring 2 that is rotatably supported on a fixed axle 3 by two rows of rolling elements each having a plurality of rolling elements 6. On its radially outer lying surface, the cutting ring 2 has an encircling cutting edge 8 that is configured to crush rock and/or earth.

The rolling elements 6 roll on inner raceways and outer raceways, and the inner raceways are provided on a two-part inner ring 4-1, 4-2 that is installed on the fixed axle 3. As can be seen in FIG. 1, each of the two inner-ring parts 4-1, 4-2 includes an elongated shoulder that extends in the axial direction, and the two elongated shoulders oppose each other and abut against each other in the installed state shown in FIG. 1.

In addition to the cutting edge 8, the cutting ring 2 includes two shoulders 10-1, 10-2 that each protrude axially outward (away from the center plane of the cutting ring). Radially below the shoulders 10-1, 10-2 is the radially inner lateral surface of the cutting ring in which the outer raceways 12 for the rolling elements 6 are provided. The two outer raceways 12 in the radially inner surface of the cutting ring 2 are preferably turned and/or ground.

The radially inner circumferential surface of the cutting ring 2 with the outer raceways 12 and the inner ring define between them an inner space in which the rolling elements 6 are arranged. In order to protect this interior from external contaminants, an end cap 14 and a closure cap 16 are provided that axially delimit the interior. Here the end cap 14 and the closure cap 16 are connected to the axle 3 such that they are rotationally fixed with the axle 3. Furthermore, a securing element (not shown) for the end cap 14 and/or closure cap 16 can be provided that simultaneously serves as a preload component for the bearing assembly. A clamping ring or a shaft nut can be provided as the securing element or preload component.

As can be seen in FIG. 1, the closure cap 16 and the end cap 14 each include an axially inwardly protruding projection 18-1, 18-2. In the installed state, each projection 18-1, 18-2 lies radially adjacent to a corresponding shoulder 10-1 or 10-2 so that each radially outer surface of a projection 18-1, 18-2 lies adjacent to a radially inner surface of a shoulder 10-1, 10-2. Furthermore, the closure cap 16 or the end cap 14 is arranged such that an axially inner surface 20-1 of the projection 18-1 or 18-2 opposes an axially lateral surface 22 of the cutting ring 2. A certain degree of sealing for the interior is already achieved by this arrangement.

In order to further protect the interior from external contaminants, a slide-ring seal 24 is respectively provided between the projection 18-1 of the end cap 14 and the projections 18-2 of the closure cap 16. The slide-ring seal 24 of FIG. 1 comprises exactly one metallic slide ring 26 that slidingly abuts against the axially lateral surface 22 of the cutting ring 2 and exactly one preload element 28 that is configured to preload the slide ring 26 so that the slide ring 26 slidingly abuts against the axially lateral surface 22. The preload element 28 can in particular be an elastic preload element. For example, the preload element 28 can be manufactured from an elastomer.

In order to reduce friction between the mutually abutting surfaces, the axially lateral surface 22 of the cutting ring 2 is configured as a slide surface for the slide ring 26. For this purpose, the axially lateral surface 22 can be ground and/or turned in order to form a corresponding surface. The axially lateral surface 22 can preferably be formed together with the outer raceways 12. The radially outer surface of the projection 18, the axially inner surface of the projection 18, and/or the radially inner surface of the shoulders 10-1, 10-2 can also be configured as slide surfaces in order to further reduce friction in the cutting ring assembly. Since the axially lateral surface 22 of the cutting ring 2 is configured as a slide surface for the slide ring 26, in contrast to known slide-ring seals in which each slide-ring seal is comprised of two slide rings and two preload elements, the number of required slide-ring seals can be halved.

In summary, providing the outer raceways 12 on the radially inner surface of the cutting ring 2 provides multiple advantages. For example, since the cutting ring 2 has a significantly greater material strength in the radial direction as compared to a conventional outer ring, the risk that the outer raceways 12 will deform due to forces acting thereon and thereby disrupt the rolling movement of the rolling elements 6, is further minimized.

Furthermore, the cutting-roller assembly 1 can be made more compact, since the outer rings can be omitted. Furthermore, the cutting ring assembly 1 also makes it possible to provide a steeper pressure angle, whereby a better load-carrying capacity is possible.

By forming the axial side surfaces 22 of the cutting ring 2 as sliding surfaces for a slide-ring seal 24, the number of slide-ring seals required can be halved compared to conventional slide-ring seals, since only one slide ring is required on each axial side of the cutting ring assembly.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved cutting rings and cutting ring assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cutting-ring assembly
2 Cutting ring
3 Axle
4-1, 4-2 Inner ring
6 Rolling element
8 Cutting edge
10-1, 10-2 Shoulder
12 Outer raceway
14 End cap
16 Closure cap
18-1, 18-2 Projection
20-1, 20-2 Axially inner surface
22 Axially lateral surface
24 Slide-ring seal
26 Slide ring
28 Preload element

What is claimed is:

1. A cutting ring assembly for a tunnel boring machine, comprising:
a fixed axle,
an inner ring rotationally fixed to the axle and having an inner raceway on a radially outer surface,
a cutting ring having a radially inner surface forming an outer raceway, and
a plurality of rolling elements between the inner raceway and the outer raceway supporting the cutting ring on the inner ring for rotation relative to the axle,
wherein the inner ring includes: a) a first part having a raceway and a first integral axially extending elongated shoulder and b) a second part having a raceway and a second integral axially extending elongated shoulder that contacts the first integral axially extending elongated shoulder.

2. The cutting ring assembly according to claim 1, wherein the plurality of rolling elements comprise tapered rollers.

3. The cutting ring assembly according to claim 2, wherein the radially inner surface of the cutting ring and the inner ring define an outer boundary and an inner boundary of an interior,
wherein the plurality of rolling elements is located in the interior,
wherein the cutting ring assembly includes an end cap that delimits a first axial side of the interior and a closure cap that delimits a second axial side of the interior, and
wherein the end cap and the closure cap are connected to the axle in a rotationally fixed manner.

4. The cutting ring assembly according to claim 3, including a first slide ring seal between the end cap and the cutting ring to seal the interior, the first slide ring seal comprising a first metallic slide ring slidingly abutting against a first axially lateral surface of the cutting ring and a first preload element in a space between the end cap and the cutting ring.

5. The cutting ring assembly according to claim 4, wherein the first axially lateral surface is configured as a slide surface for the slide ring.

6. The cutting ring assembly according to claim 4,
wherein the first slide ring seal is the only slide ring seal between the end cap and the cutting ring and the first preload element is the only preload element between the end cap and the cutting ring.

7. The cutting ring assembly according to claim 4,
including a second slide ring seal between the closure cap and the cutting ring to seal the interior, the second slide ring seal comprising a second metallic slide ring slidingly abutting against a second axially lateral surface of the cutting ring and a second preload element in a space between the closure cap and the cutting ring.

8. The cutting ring assembly according to claim 7,
wherein the second slide ring seal is the only slide ring seal between the closure cap and the cutting ring and the second preload element is the only preload element between the closure cap and the cutting ring.

9. The cutting ring assembly according to claim 7,
wherein the second axially lateral surface is configured as a slide surface for the slide ring.

10. The cutting ring assembly according to claim 4,
wherein the cutting ring includes a first axially outwardly protruding shoulder,
wherein the end cap includes an axially inwardly protruding projection radially adjacent to the first axially outwardly protruding shoulder, and
wherein an axially inner surface of the projection of the end cap faces an axially lateral first surface of the cutting ring.

11. The cutting ring assembly according to claim 10,
wherein the cutting ring includes a second axially outwardly protruding shoulder,
wherein the closure cap includes an axially inwardly protruding projection radially adjacent to the second axially outwardly protruding shoulder, and
wherein an axially inner surface of the projection of the closure cap faces an axially lateral second surface of the cutting ring.

12. The cutting ring assembly according to claim 11,
wherein the radially inner surfaces of the first and second shoulders and/or the radially outer surface of the end cap and the radially outer surface of the closure cap and/or the axially inner surface of the end cap and the axially inner surface of the closure cap are configured as slide surfaces.

13. The cutting ring assembly according to claim 1, wherein the outer raceway is turned and/or ground.

14. A tunnel boring machine that includes at least one cutting ring assembly according to claim 1.

* * * * *